US010737918B2

(12) United States Patent
Antonsen et al.

(10) Patent No.: US 10,737,918 B2
(45) Date of Patent: Aug. 11, 2020

(54) CHAIN GUIDE AND A CHAIN WINCH COMPRISING SUCH A CHAIN GUIDE

(71) Applicant: MacGregor Norway AS, Kristiansand (NO)

(72) Inventors: Bjørn Tore Ramberg Antonsen, Fevik (NO); Jon Høvik, Færvik (NO); Knut Fiskergård, Arendal (NO); Gisle Filskov Knutsen, Arendal (NO)

(73) Assignee: MacGregor Norway AS, Kristiansand (NO)

( * ) Notice: Subject to any disclaimer, the term of this patent is extended or adjusted under 35 U.S.C. 154(b) by 0 days.

(21) Appl. No.: 15/526,133

(22) PCT Filed: Nov. 13, 2015

(86) PCT No.: PCT/EP2015/076560
§ 371 (c)(1),
(2) Date: May 11, 2017

(87) PCT Pub. No.: WO2016/075291
PCT Pub. Date: May 19, 2016

(65) Prior Publication Data

US 2017/0313557 A1 Nov. 2, 2017

(30) Foreign Application Priority Data

Nov. 14, 2014 (NO) .................................... 20141371

(51) Int. Cl.
*B66D 1/72* (2006.01)
*F16H 55/30* (2006.01)
(Continued)

(52) U.S. Cl.
CPC ................. *B66D 1/72* (2013.01); *B66D 1/08* (2013.01); *B66D 5/16* (2013.01)

(58) Field of Classification Search
CPC ......... F16H 55/30; F16H 55/303; B66D 1/72; B66D 1/08; B66D 5/16
See application file for complete search history.

(56) References Cited

U.S. PATENT DOCUMENTS

| | | | | |
|---|---|---|---|---|
| 1,532,775 A * | 4/1925 | Page | E02F 3/60 | 37/401 |
| 3,282,045 A * | 11/1966 | Yves | F16G 15/04 | 59/93 |

(Continued)

FOREIGN PATENT DOCUMENTS

| | | | |
|---|---|---|---|
| EP | 1213255 | A2 | 6/2002 |
| WO | 2013/067534 | A2 | 5/2013 |
| WO | 2013/132004 | A1 | 9/2013 |

OTHER PUBLICATIONS

International Search Report issued in corresponding application No. PCT/EP2015/076560 dated Feb. 8, 2016 (3 pages).

(Continued)

*Primary Examiner* — Michael E Gallion
(74) *Attorney, Agent, or Firm* — Osha Liang LLP

(57) ABSTRACT

A chain guide for a chain winch and a chain winch which includes such a chain guide. The chain guide is rotatable about a first rotational axis and adapted for support of a chain including chain links having at least two different sizes where a first chain portion includes a plurality of first chain links and a second chain portion includes a plurality of second chain links where the size of the second chain links is larger than the size of the first chain links. The chain guide includes at least one first chain support, which is adapted for support of at least the first chain links of the first chain portion, and at least one second chain support, which is adapted for support of at least the second chain links of the second chain portion.

19 Claims, 18 Drawing Sheets

(51) Int. Cl.
*B66D 1/08* (2006.01)
*B66D 5/16* (2006.01)

(56) References Cited

U.S. PATENT DOCUMENTS

| | | | | |
|---|---|---|---|---|
| 3,766,791 | A * | 10/1973 | Huttinger | F16H 55/303 474/155 |
| 3,805,728 | A * | 4/1974 | Abraham | B63B 21/18 114/200 |
| 3,985,093 | A | 10/1976 | Eidem | |
| 5,205,793 | A * | 4/1993 | Jones | F16H 55/303 474/141 |
| 5,275,379 | A * | 1/1994 | McAleer | B66D 1/72 114/293 |
| 7,104,214 | B2 * | 9/2006 | Niebur | B63B 21/10 114/230.2 |
| 7,240,633 | B2 * | 7/2007 | Barlow | B63B 21/04 114/200 |
| 8,435,146 | B2 * | 5/2013 | Chiu | F16H 55/303 254/311 |
| 8,893,636 | B2 * | 11/2014 | Tomas | B63B 21/18 114/200 |
| 8,915,205 | B2 * | 12/2014 | Miller | B63B 21/10 114/200 |
| 9,127,747 | B2 * | 9/2015 | Sun | F16G 15/04 |
| 9,567,039 | B2 * | 2/2017 | Busson | B63B 21/18 |
| 2002/0084449 | A1 * | 7/2002 | Hovik | B63B 21/18 254/264 |
| 2008/0153645 | A1 * | 6/2008 | Chiu | B66D 1/72 474/152 |
| 2009/0029815 | A1 * | 1/2009 | Molnes | B63B 21/04 474/155 |
| 2009/0309083 | A1 * | 12/2009 | Weingartner | B66D 3/26 254/358 |
| 2013/0105750 | A1 * | 5/2013 | Hystad | B63B 21/16 254/372 |
| 2013/0116075 | A1 * | 5/2013 | Miller | F16H 55/30 474/155 |
| 2014/0072394 | A1 * | 3/2014 | Rossi | B66D 1/04 414/466 |

OTHER PUBLICATIONS

Written Opinion of the International Searching Authority issued in corresponding application No. PCT/EP2015/076560 dated Feb. 8, 2016 (5 pages).
Norwegian Search Report issued in corresponding application No. 20141371 dated Apr. 21, 2015 (2 pages).
International Preliminary Report on Patentability issued in corresponding application No. PCT/EP2015/076560 dated Nov. 14, 2016 (43 pages).

* cited by examiner

CHAIN GUIDE AND A CHAIN WINCH COMPRISING SUCH A CHAIN GUIDE

One or more embodiments of present invention relate to a chain guide for a chain winch and a chain winch comprising such a chain guide where the chain guide is configured to support a chain comprising chain links having at least two different sizes. The chain winch is suitable for use with mooring chains for a floating structure.

In the current mooring market there is a growing focus on saving top side weight and space for all types of equipment. When floating installations are moored, it is common to use chains which are anchored to the sea bottom. In order to reduce weight and space, the applicant has contemplated using chains having chain links with at least two different sizes in the mooring chain. Using a chain with smaller chain links for installation gives less chain to store at the top side and is structurally feasible as the large forces only occur after installation, when a chain with large chain links will take the loads.

The applicant has previously developed a chain winch for mooring of floating structures which is disclosed in EP 1213255 B1. The chain winch disclosed comprises a chain wheel over which the chain moves and a chain stopper and a rocker pawl which is mounted on a telescopic arm. The pawls and the chain stopper cooperate to haul in the chain and to move it over the chain wheel.

The chain winch disclosed in this publication cannot be used to pull in chains having chain links with different sizes.

In WO 2013/067534 A1 there is disclosed a chain guide which is designed to handle a chain with chain links having two different sizes.

It has therefore been an objective to develop a chain guide which is capable of handling a chain comprising chain links with a plurality of different sizes.

It has also been an objective to develop a chain winch which is capable of handling a chain with at least two differently sized chain links and any connection links.

It has also been an objective to avoid the need of replacing or adding additional components to the existing equipment on a floating structure.

These objectives are achieved with a chain guide as defined in claim 1 and the chain winch as defined in claim 12. Further embodiments of the chain guide and the chain winch are defined in the dependent claims.

Introducing two chain sizes does not only double the chain geometries that the chain winch must be capable of handling. Since a typical two sized chain may be designed with two connection links, four different chain link geometries must fit the chain winch.

The chain winch comprises a chain stopper and a pawl element which therefore should be able to engage all types of chain links in the chain at all times. Hence, the chain stopper and the pawl element of one or more embodiments of the present invention have been designed to be able to handle the geometry of all involved links in the chain. To make the different chain link geometries fit in the chain winch, a new chain stopper and a new chain guide in form of a chain guiding wheel has been developed.

The chain guide is specially designed to align the different chain sizes with the chain stoppers. The chain guide also ensures that the chain links are supported to avoid any excessive loading/bending as links are passing over the chain guide. The chain guide therefore has distinct sectors which are used at certain points in the haul in process. Each sector consists of one or more pockets which will force the chain in line with the chain stopper, making the chain capable of landing correctly in the chain stopper.

The chain stopper is designed with two chain stopper elements having individual seats for each chain size. The large pocket also accommodates the small chain and connection link during the transition between small/large sizes. The pawl element is designed with two separate seats for various chain sizes. It is shaped to fit (not collide with) all links passing over the chain guide.

Hence, there is provided a chain guide for a chain winch where the chain guide is rotatable about a first rotational axis and adapted for support of a chain comprising chain links having at least two different sizes where a first chain portion comprises a plurality of first chain links and a second chain portion comprises a plurality of second chain links wherein the size of the second chain links are larger than the size of the first chain links. The chain guide comprises at least one first chain support, which is adapted for support of at least the first chain links of the first chain portion, and at least one second chain support, which is adapted for support of at least the second chain links of the second chain portion.

The first support sector and the second support sector are preferably further adapted for the transition from small links, i.e. first chain links, to large links, i.e. second chain links. The first chain support may therefore comprise a first support sector having a first regular support sector and a first transition support sector for support of at least the first chain links of the first chain portion and the second chain support may comprise a second support sector having a second regular support sector and a second transition support sector for support of the second chain links of the second chain portion and at least one connection link respectively.

The at least one first chain support, in the first support sector, may comprise at least one first chain link pocket which is adapted for support of a first chain link. The at least one second chain support, in the second support sector, may comprise at least one second chain link pocket which is adapted for support of a second chain link.

The second chain pocket or pockets may also support any connection links which is used to connect first chain portion and the second chain portion of the chain.

The at least one first chain support may further comprise a first transition support sector which is designed to bring the first chain portion of the chain to a radial distance from the first rotational axis which facilitates the transition from support of the first chain portion on the at least one first chain support to support of the second chain portion on the at least one second chain support. Since the supporting surface of the first support sector has a smaller radius, i.e. a smaller distance from the first rotational axis, than the second support sector, the chain is preferably moved radially outwards from the first rotational axis during the transition phase in which the chain guide goes from supporting the first chain portion of the chain to supporting the second chain portion of the chain. The first transition support sector is provided with at least one first chain link pocket for support of a first chain link.

The at least one second chain support may further comprise a second transition support sector in which there is provided at least one connection link pocket for support of at least one connection link which links the first chain portion and the second chain portion of the chain.

The at least one first chain link pocket, the at least one second chain link pocket and the at least one connection link pocket are preferably adapted for supporting lying links of the chain.

The chain guide may comprise a centre element and a first chain support on either side of the central element in the axial direction where the two first chain supports and the centre element is arranged between two second chain supports in the axial direction, i.e. the centre element and the first chain supports are sandwiched between the two second chain supports. The centre element is preferably provided with an axial width, or thickness, which is sufficiently large to accommodate upright links of the chain. The chain guide preferably also comprises two side plates between which the at least one first chain support, the at least one second chain support and the centre element are arranged.

The chain guide is preferably adapted for a rotational back and forth movement during hauling in of the chain. The fact that the chain guide is divided into various support sectors allows the chain guide to be rotated back and forth instead of a continuous rotational movement in one direction. The advantage with the rocking back and forth movement of the chain guide is that it simplifies the process of synchronizing the various chain links of the chain with their respective pockets arranged in the first and second support sectors during the transition from hauling in the first chain links of the first chain portion to the second chain links of the second chain portion.

For the effecting the back and forth movement of the chain guide, the chain guide may comprise attachment means for releasable connection of the chain guide to at least one rotatable arm of the chain winch. Such attachment means may comprise a plurality of holes or recesses such that a bolt can be used to releasably attach the chain guide to the at least one rotatable arm. Other attachment means, such as hooks, may also be used to releasably attach the chain guide to the at least one rotatable arm. When the at least one rotatable arm is rotated back and forth, the chain guide is forced to follow the movements of the at least one rotatable arm.

There is also provided a chain winch for a chain comprising chain links having at least two different sizes where a first chain portion comprises a plurality of first chain links and a second chain portion comprises a plurality of second chain links wherein the size of the second chain links are larger than the size of the first chain links, wherein the chain winch comprises a chain guide as described above.

The chain winch is further preferably provided with a chain hauling device comprising a pawl element which is capable of engaging a chain link of the chain; the chain hauling device being configured to move the pawl element. The pawl element may be provided with a first chain seat which is adapted for support of a first chain link of the first chain portion, and a second chain seat which is adapted for support of a second chain link of the second chain portion. The first chain seat of the pawl element may also be designed such that it is capable of supporting both the first chain links of the first chain portion and a connection link which is arranged between the first chain portion and the second chain portion. The pawl element is used for hauling in and letting out chain and is therefore moved in and out of engagement with the chain as the pawl element changes its supporting position on the chain.

The pawl element may comprise at least one side element, but preferably two, one on either side of the pawl element, which is configured to fit into at least two separate recesses in one of the side plates of the chain guide, or at least two corresponding pairs of recesses in the side plates when there is provided a side element on each side of the pawl element, wherein a first recess is adapted for use when the pawl element supports a first chain link and a second recess is adapted for use when the pawl element supports a second chain link. The recesses are preferably provided in the outer circumference of the side plate or side plates. The depth of the recesses may be chosen so that the first chain seat of the pawl element is aligned with the first chain links when a first chain portion is passing through the chain guide and the second chain seat of the pawl element is aligned with the second chain links when a second chain portion is passing through the chain guide.

The chain winch further preferably comprises a chain stopper which is provided with at least one chain stopper element where the chain stopper element is capable of supporting and holding the chain. The at least one chain stopper element may have a first chain seat which is adapted for support of a first chain link of the first chain portion, and a second chain seat which is adapted for support of a second chain link of the second chain portion. The at least one chain stopper element is preferably movable between a locking position in which the at least one chain stopper is in engagement with the chain and the chain is prevented from passing through the chain stopper in at least one direction, and an open position in which the chain can pass through the chain stopper. Preferably the chain stopper is provided with two chain stopper elements which are arranged on opposite sides of the chain passing through the chain winch and which are rotatable between a locking position in which the two chain stoppers are in engagement with the chain and an open position in which the chain can pass through the chain stopper. The chain stopper is used to support and hold the chain in its position as the pawl element changes its supporting and holding position on the chain.

The chain hauling device is further preferably provided with at least one arm for rotation of the chain guide where the at least one arm is adapted for releasable attachment to the chain guide. Preferably the at least one arm and the chain guide are adapted for releasable attachment of the at least one arm to the chain guide at a plurality of relative positions between the at least one arm and the chain guide. If the at least one arm is provided with a through-hole and one or both of the side plates of the chain guide are provided with a plurality of corresponding holes or recesses, a bolt which is passed through the hole in the at least one arm and into a hole in chain guide, can be used to releasably lock the at least one arm to the chain guide. The hole of the chain guide, to which the at least one arm is locked, is chosen depending on which part of the chain is passing over the chain guide.

When the at least one arm is locked to the chain guide the chain guide and the pawl element is in engagement with a chain link, the rotation of the chain guide will follow the movement of the chain and the pawl element. When the pawl element is not in engagement with the chain and the chain is supported and held by the chain stopper, the chain guide may be rotated by the arm, both in a clockwise direction As mentioned above, for the effecting the back and forth movement of the chain guide, the chain guide may comprise attachment means for releasable connection of the chain guide to at least one rotatable arm of the chain winch. Such attachment means may comprise a plurality of holes or recesses such that a bolt can be used to releasably attach the chain guide to the at least one rotatable arm. Other attachment means, such as hooks, may also be used to releasably attach the chain guide to the at least one rotatable arm. When the at least one rotatable arm is rotated back and forth, the chain guide is forced to follow the movements of the at least one rotatable arm.

To effect the movement of the at least one arm and the pawl element, the chain hauling device may comprise at least one actuator which is configured to effect a rotational back and forth movement of the pawl element and the arm. The at least one actuator may for example comprise a piston/cylinder arrangement. The at least one arm and the pawl element may be connected for example to the piston of the at least one actuator, and as the piston moves in and out of the cylinder the at least one arm will rotate the chain guide if the at least one arm and the chain guide is locked to each other, and the pawl element will haul in one or more chain links if the at least one pawl element is in engagement with a chain link of the chain.

The chain guide described above may be used for a chain wherein the ratio of the length of a second chain link to the length of a first chain link can be any number greater than one. For example the length of the second chain links of the second chain portion may be twice as long as the first chain links of the first chain portion. The chain guide and/or the chain winch described above may be used for hauling of a chain, for example an anchor chain, on a floating structure.

A non-limiting embodiment of a chain winch comprising a chain guide according to one or more embodiments of the present invention will be described in more detail below with reference to the drawings where:

Figure 5B:
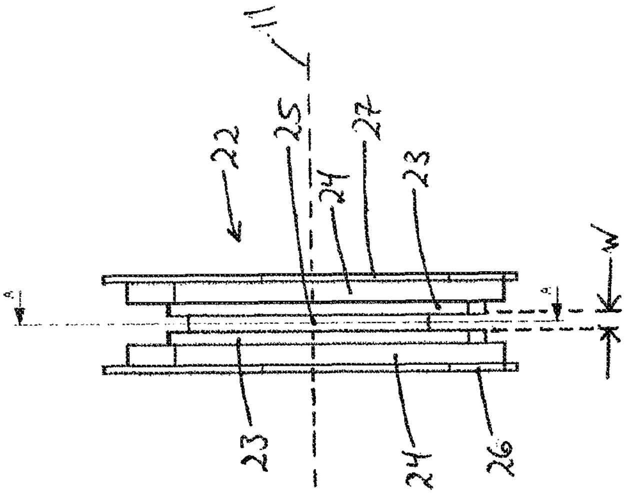
Figure 5A:
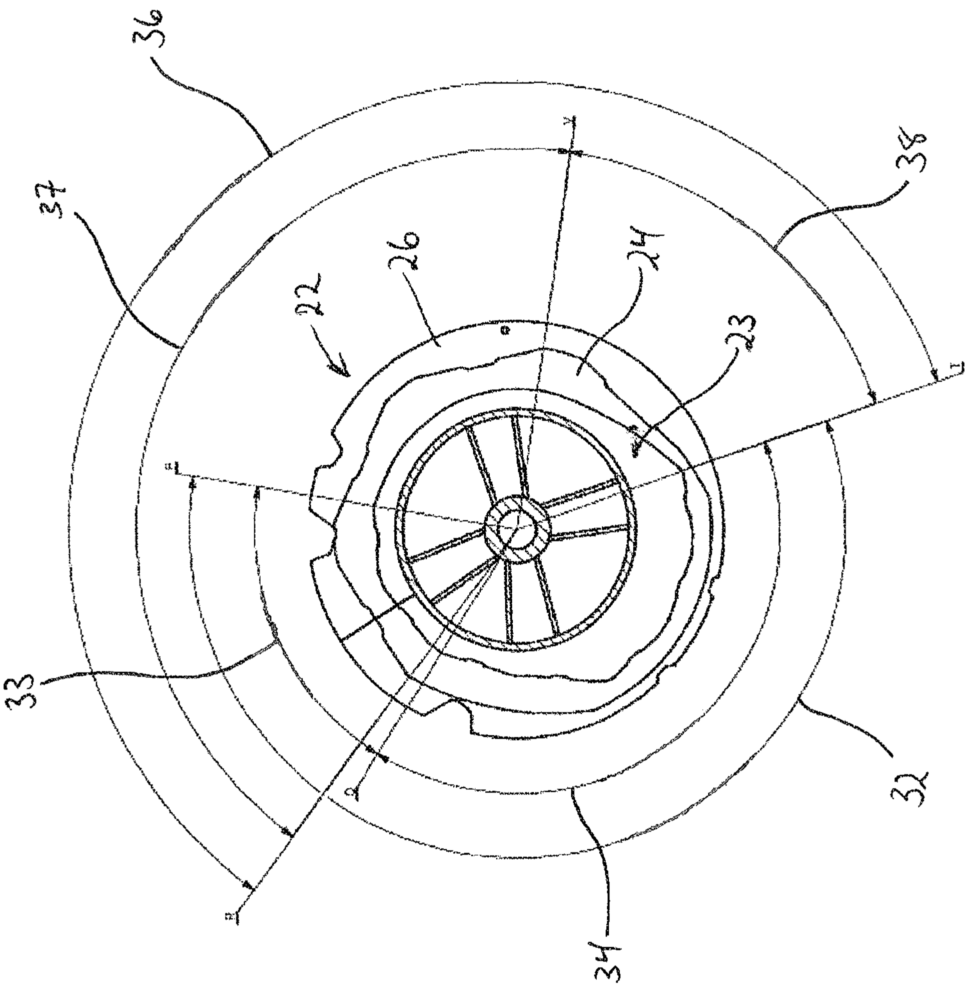

FIGS. 5*a*-5*b* illustrates the different sectors that the chain guide may be divided into.

Figure 2:
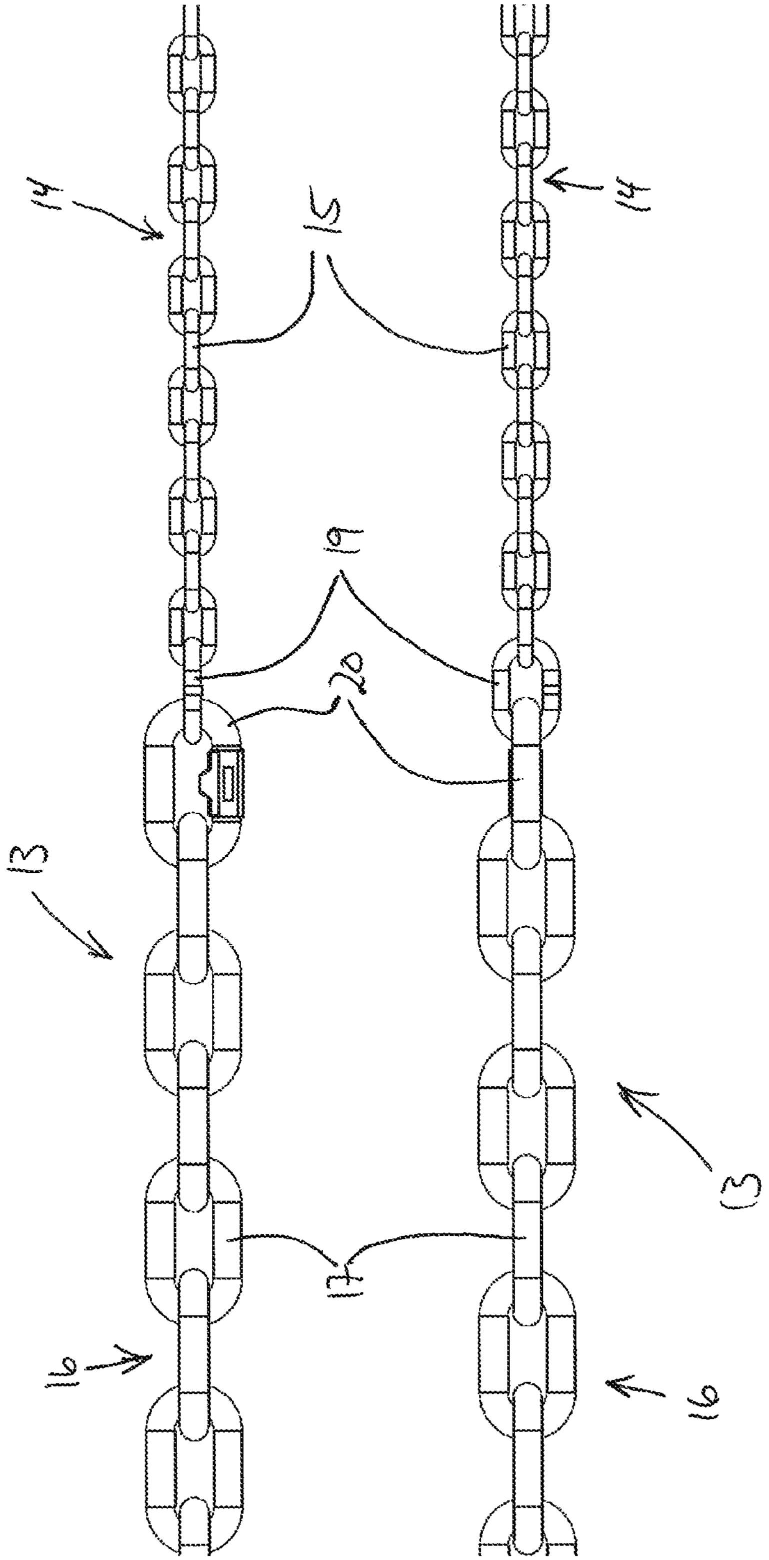
FIG. 2 illustrates a chain, seen in a top view on top and a side view at the bottom respectively, which can be hauled by a chain winch according to one or more embodiments of the present invention, where the chain has two chain portions where the chain links of the two chain portions have different sizes and where two connection links are used to connect the two chain portions.
Figure 6B:
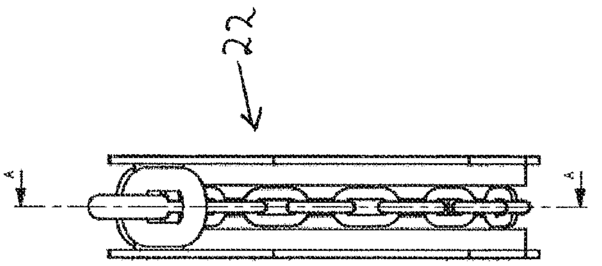
Figure 6A:
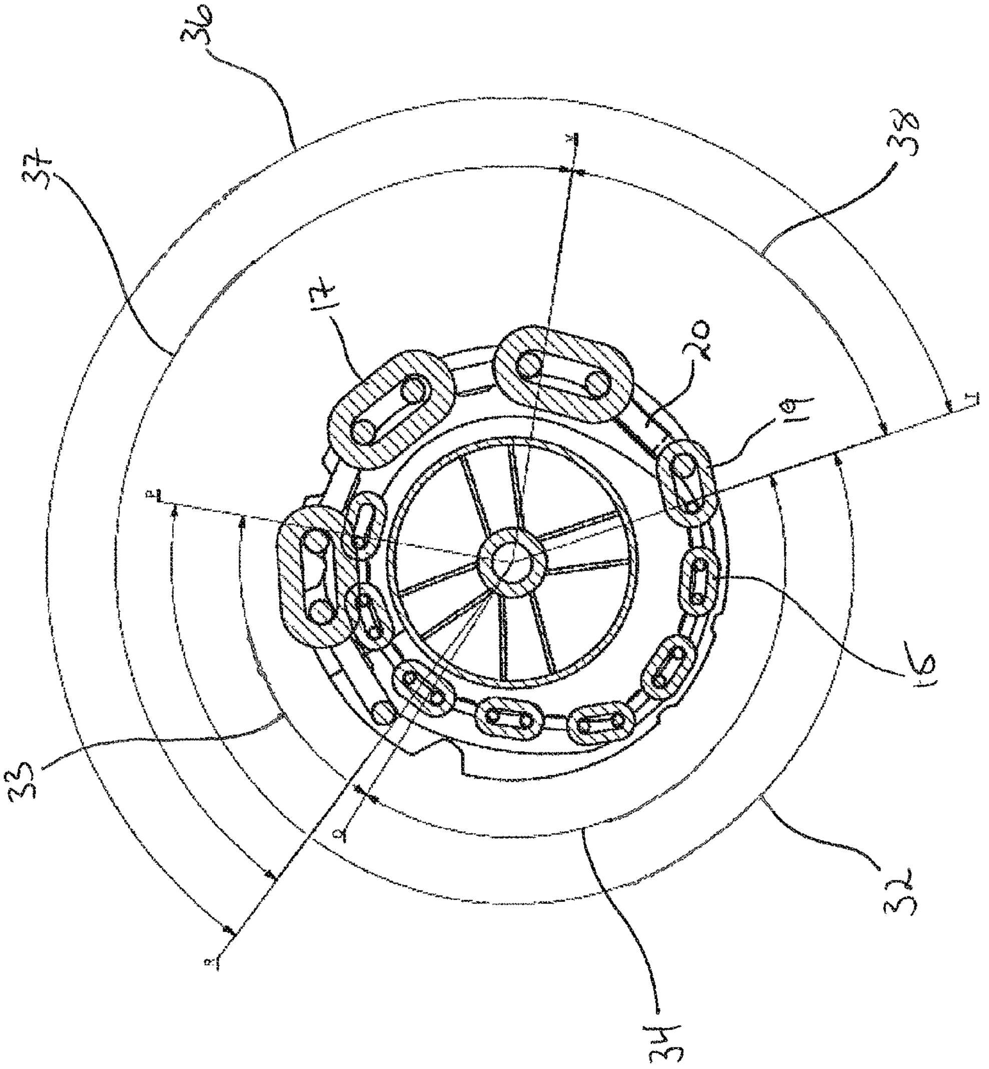

FIGS. 6*a*-6*b* illustrates the chain guide as shown in FIGS. 5*a*-5*b* and with the chain in FIG. 2 wrapped around the chain guide to illustrate how chain links of different sizes fit into respective chain pockets on the chain guide.

Figure 7A:
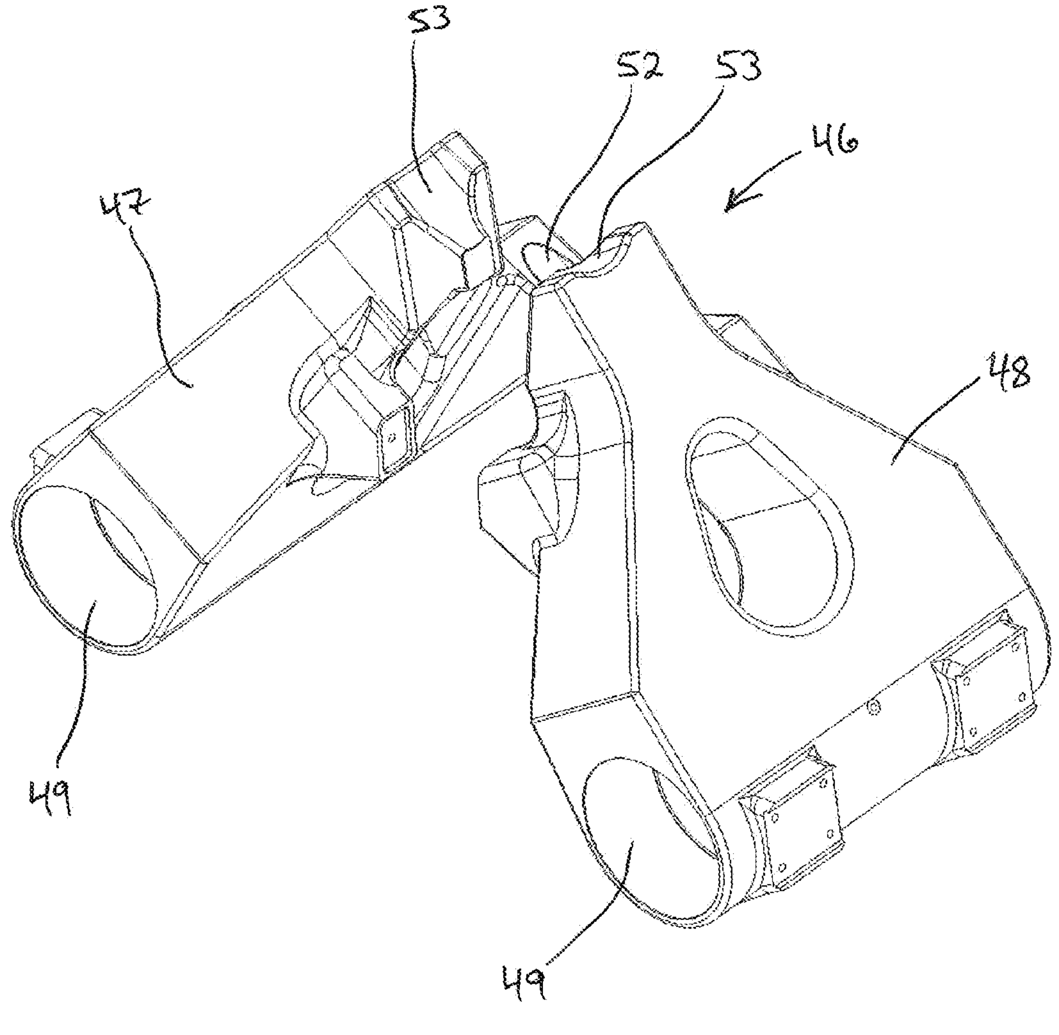
Figure 7B:
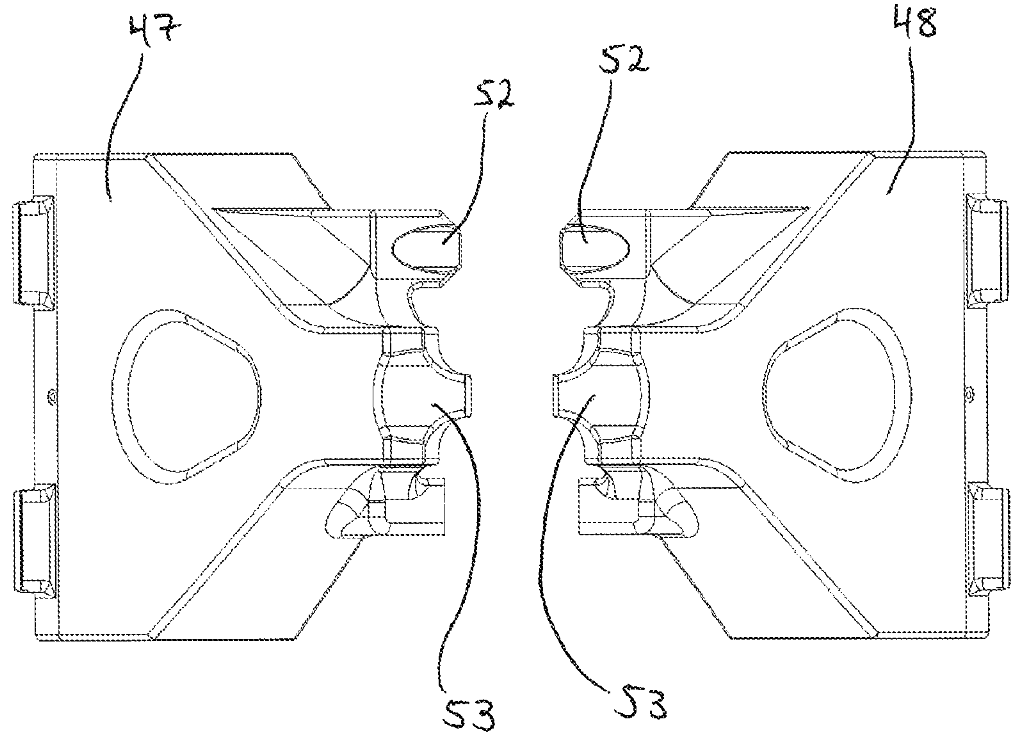

FIGS. 7*a*-7*b* show a chain stopper according to one or more embodiments of the present invention.

Figure 8A:
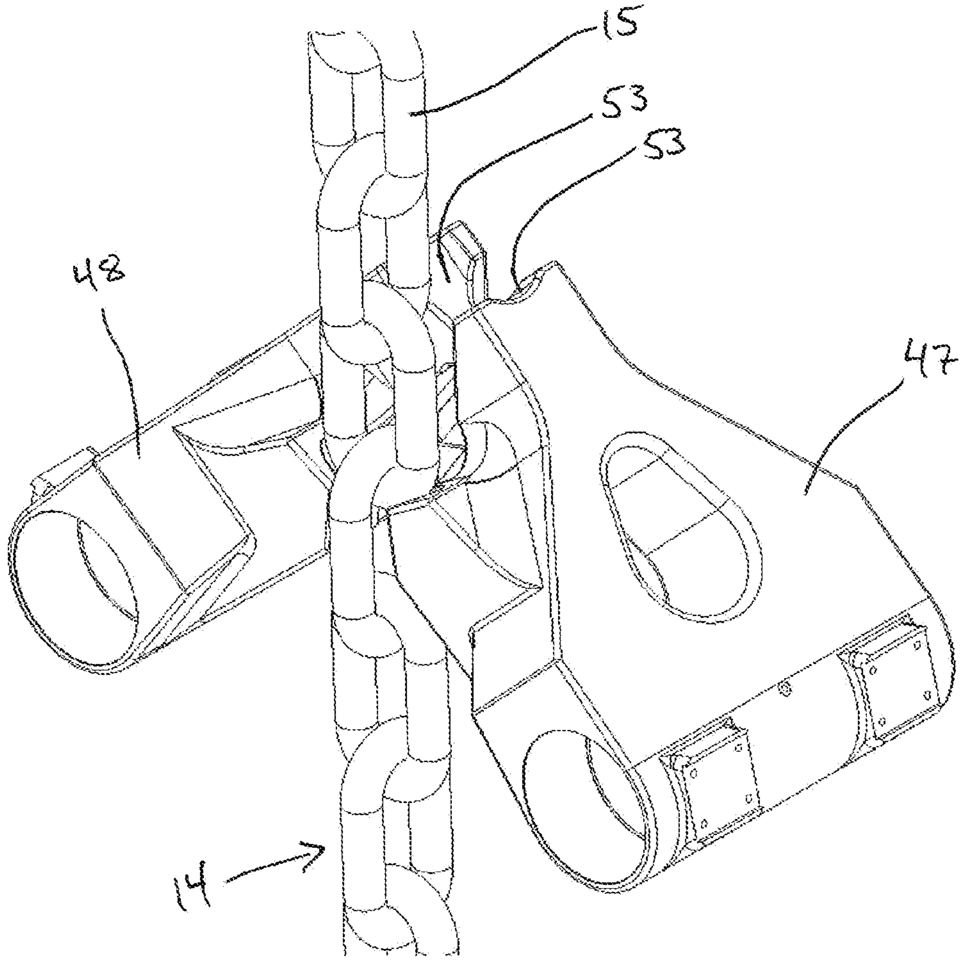
Figure 8B:
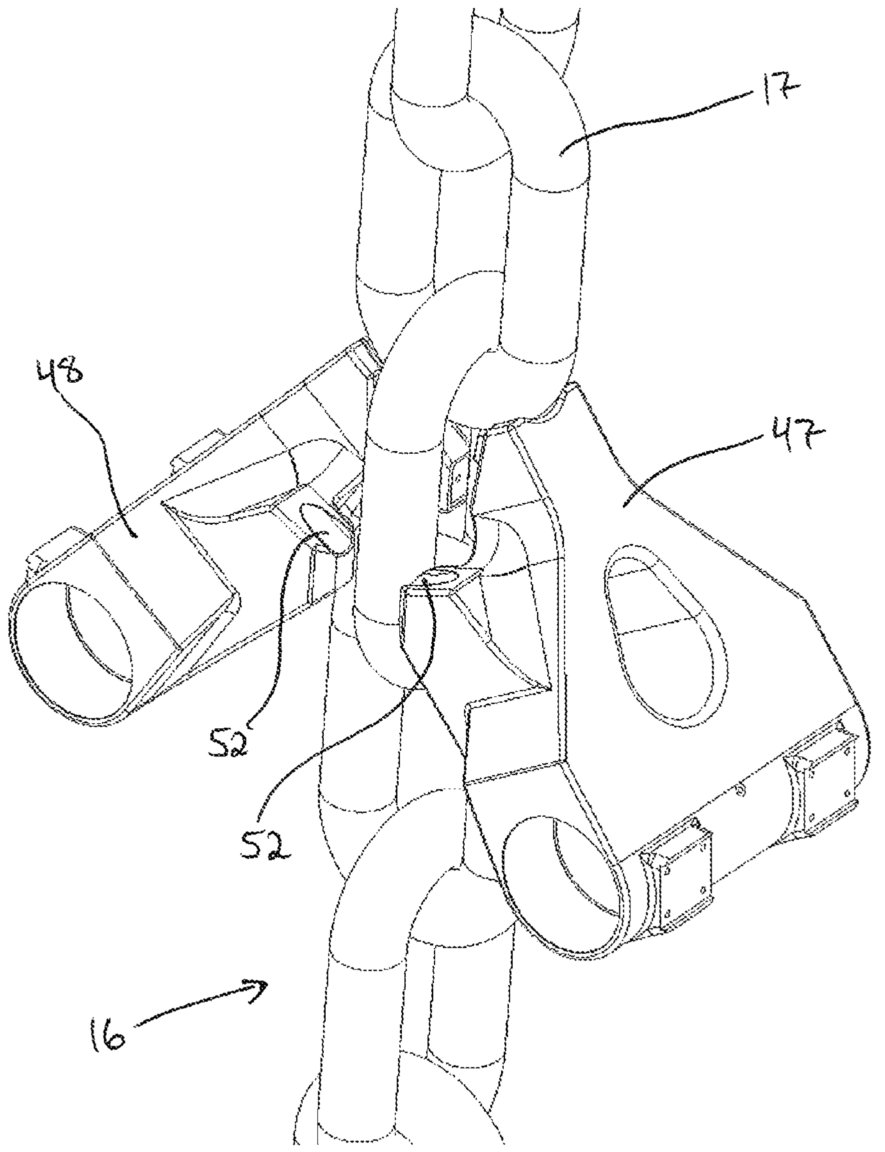

FIGS. 8*a* -8*b* show the chain stopper in FIGS. 7*a*-7*b* in engagement with a portion of the chain in FIG. 2 having small chain links and large chain links respectively.

Figure 9:
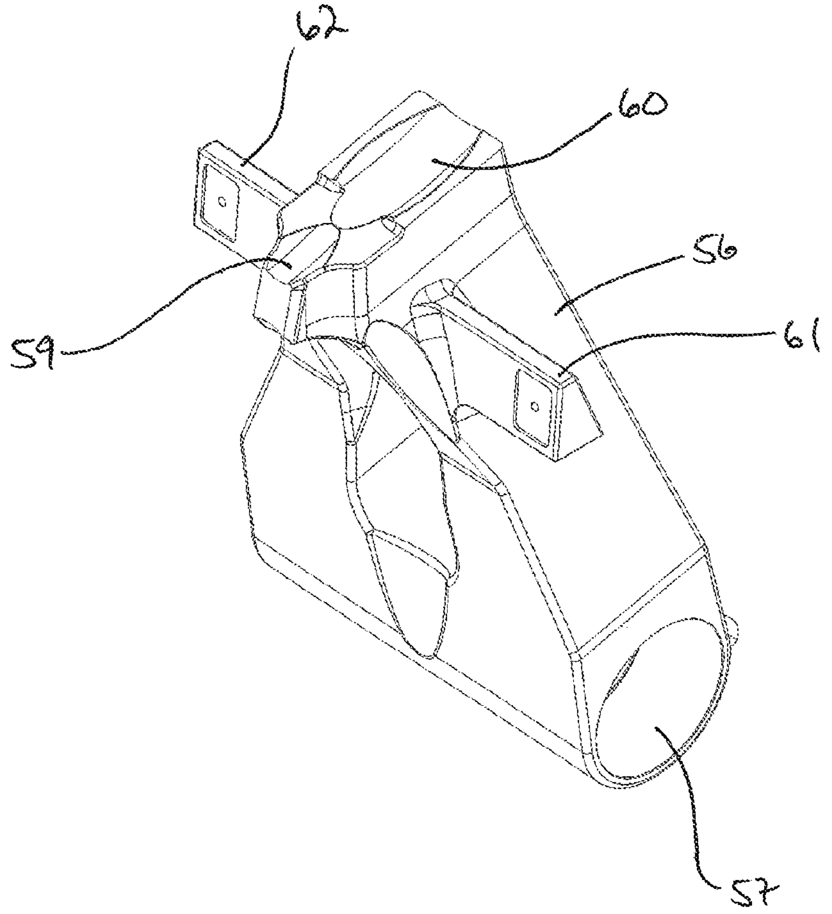

FIG. 9 shows a pawl element according to one or more embodiments of the present invention.

Figure 10A:
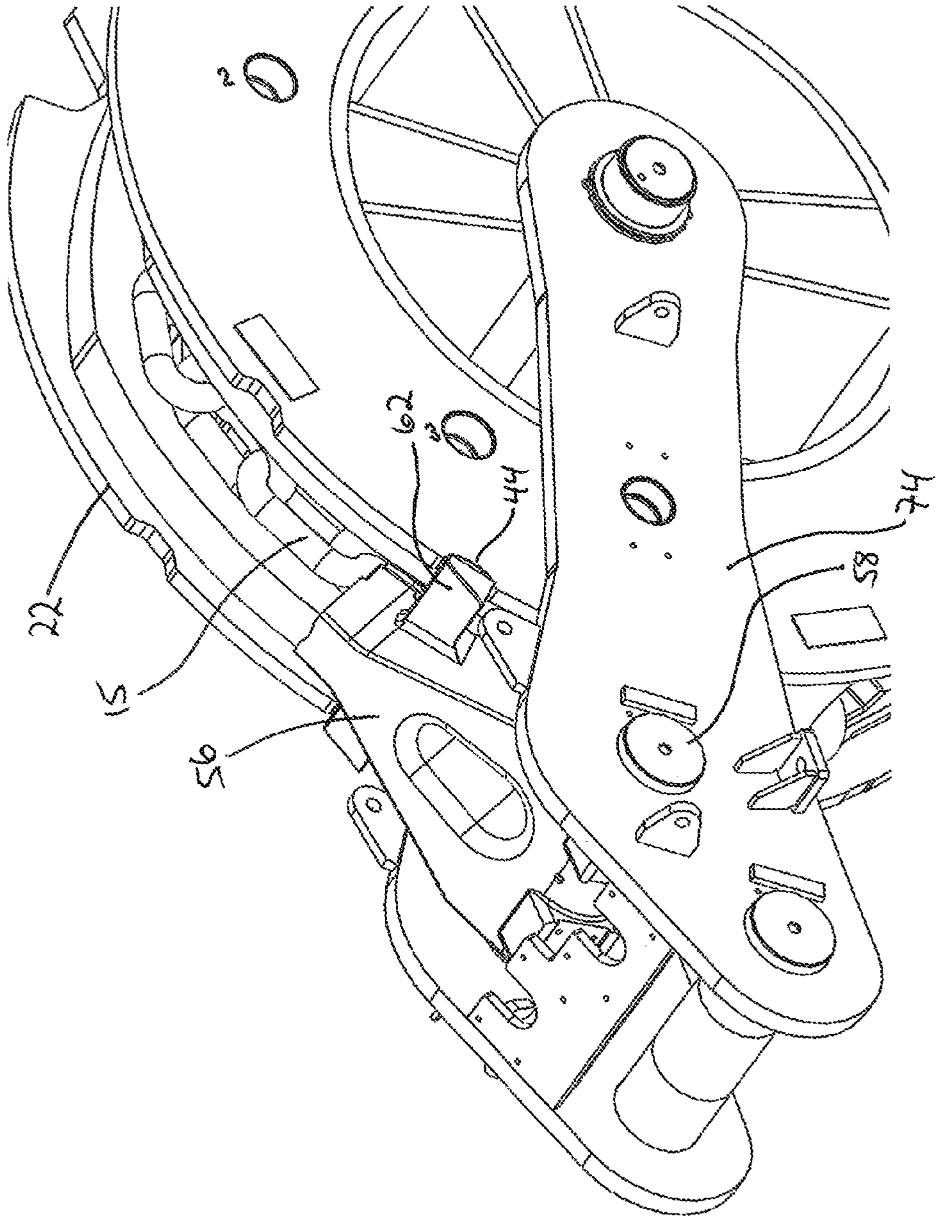
Figure 10B:
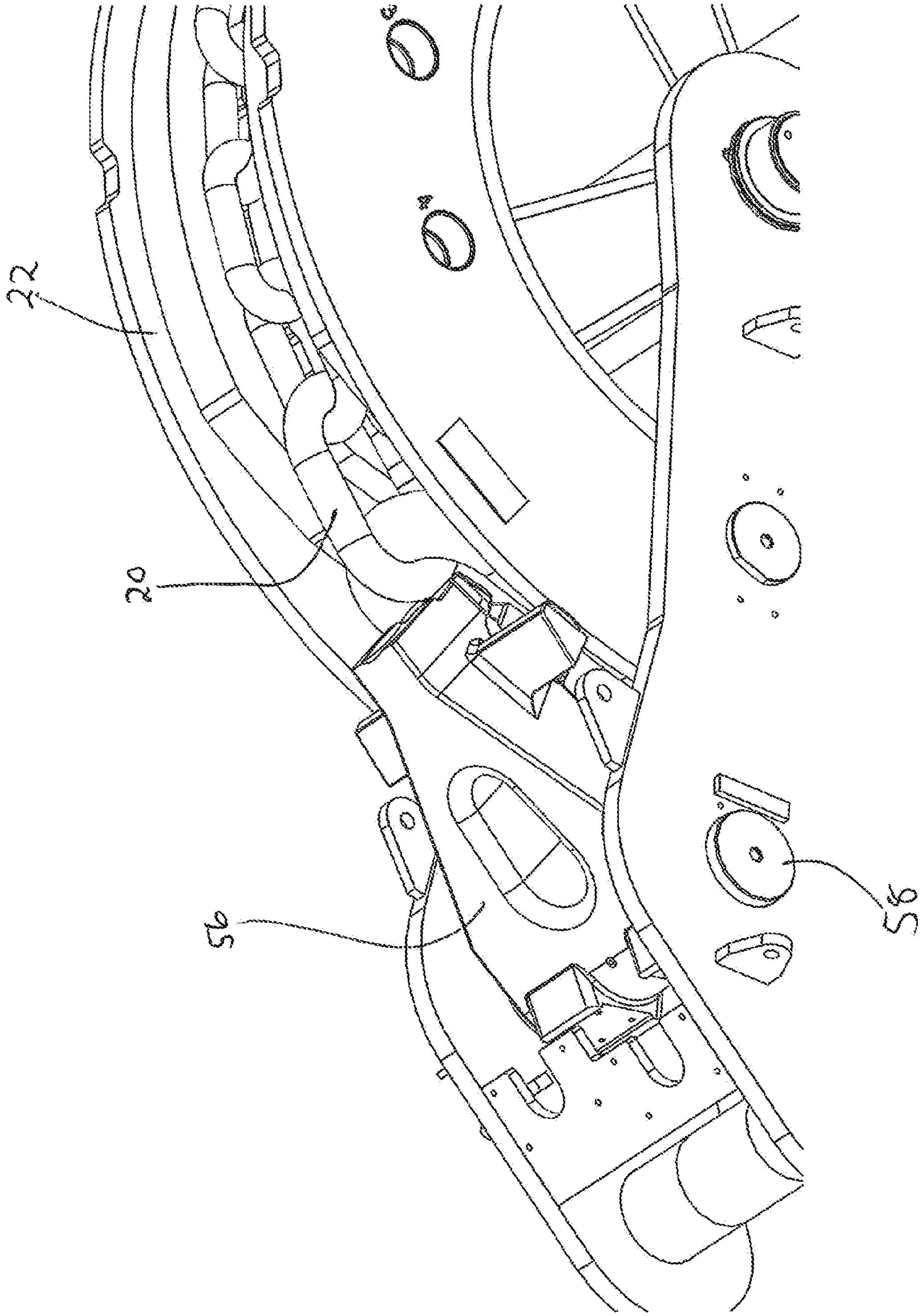
Figure 10C:
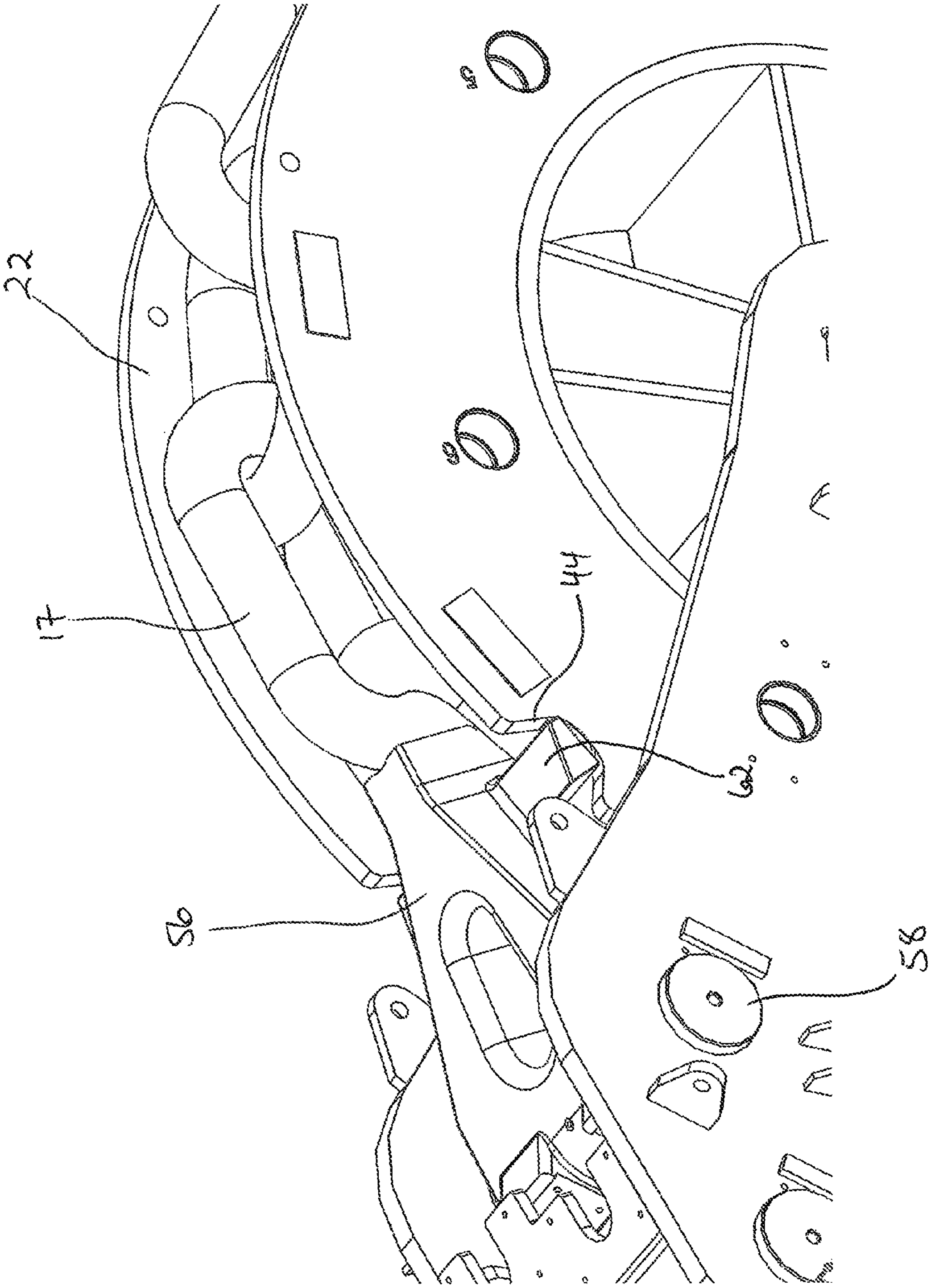

FIGS. 10*a*-10*c* show the pawl element in FIG. 9 in engagement with a portion of the chain in FIG. 2 having small chain links, a connection link of the chain and a portion of the chain having large chain links respectively.

Figure 11:
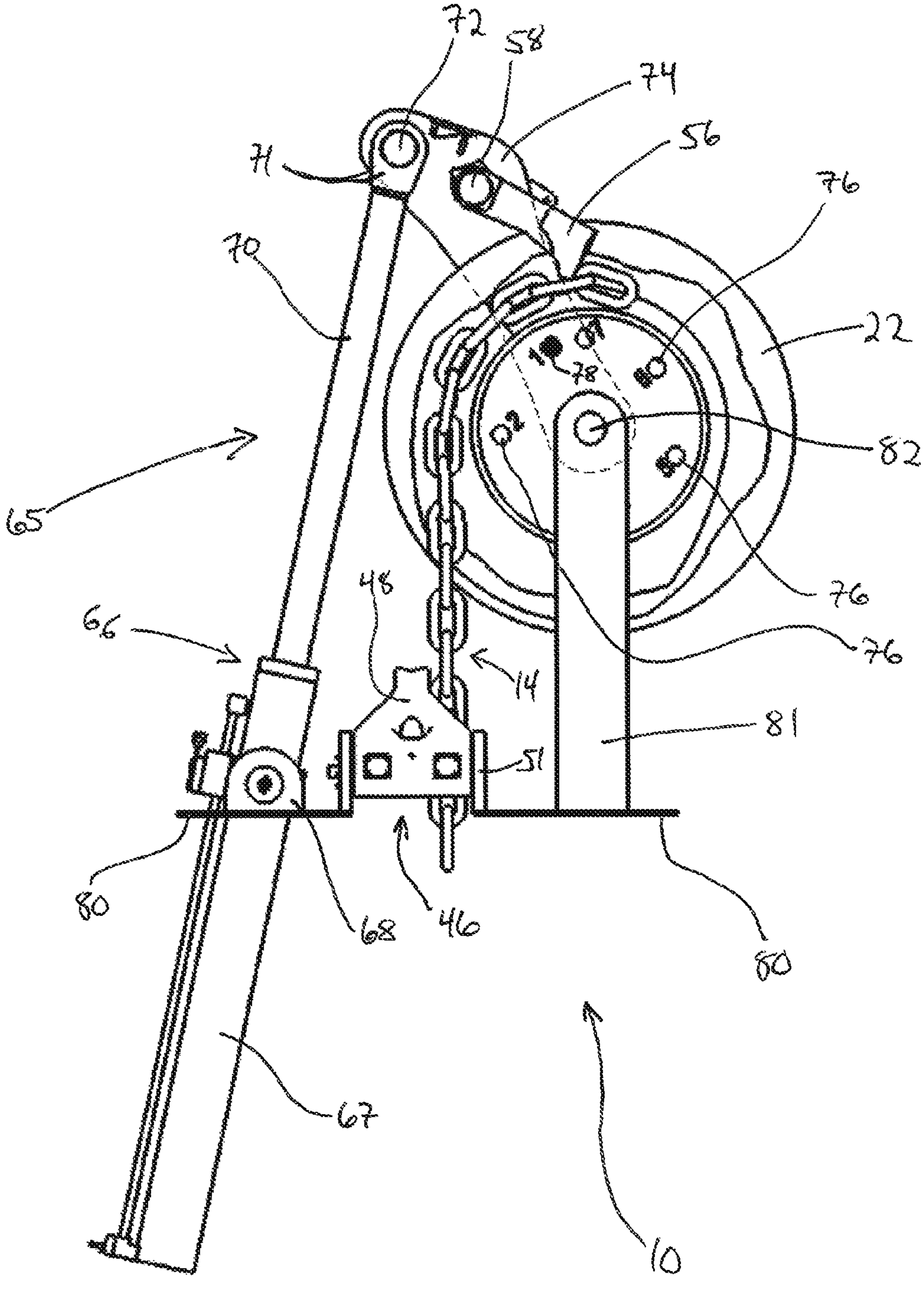

FIG. 11 shows the chain winch hauling in a portion of the chain having small chain links where the pawl element is in engagement with a chain link.

Figure 12:
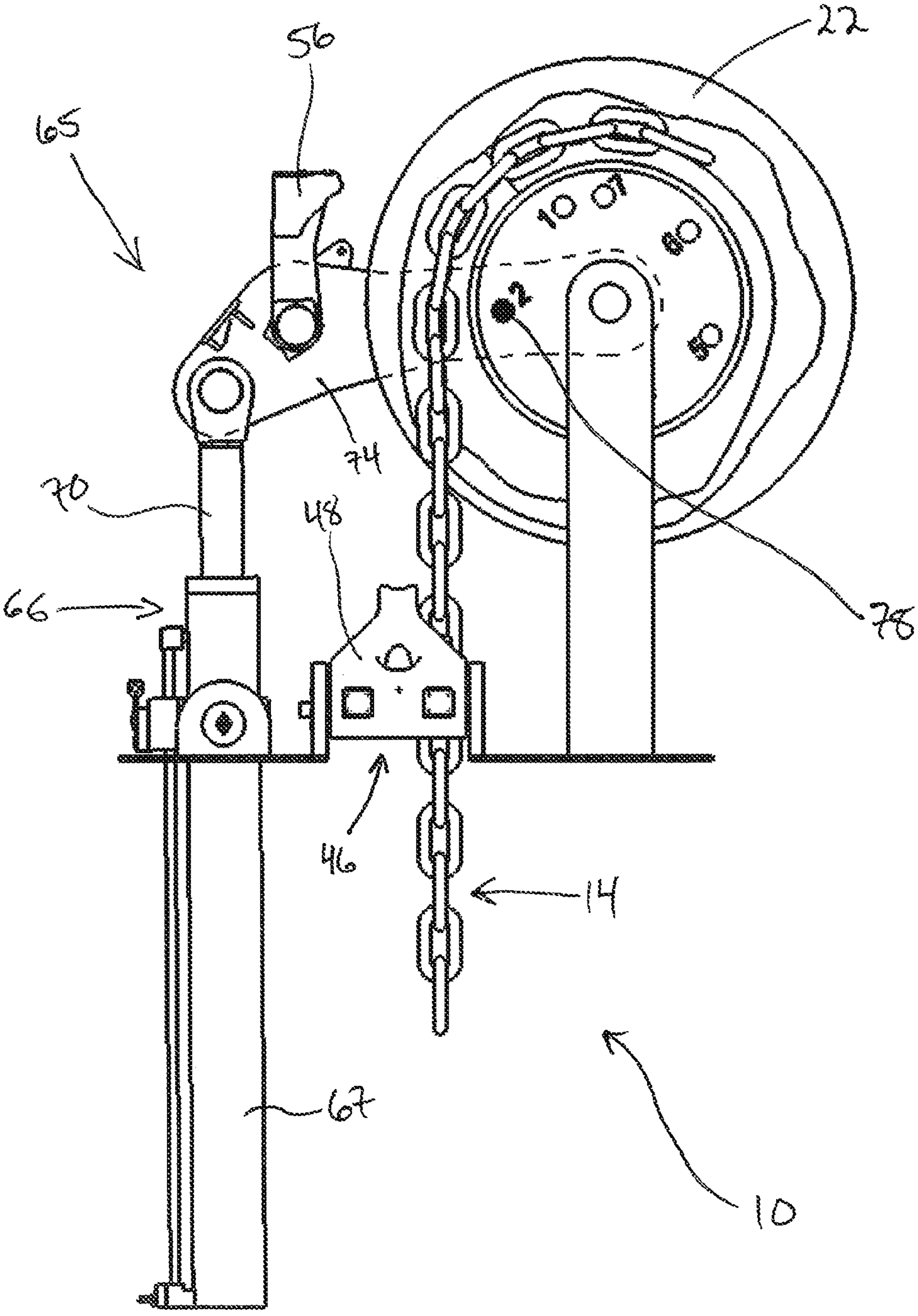

FIG. 12 shows the chain winch hauling in a portion of the chain having small chain links where the pawl element is out of engagement with the chain.

Figure 13:
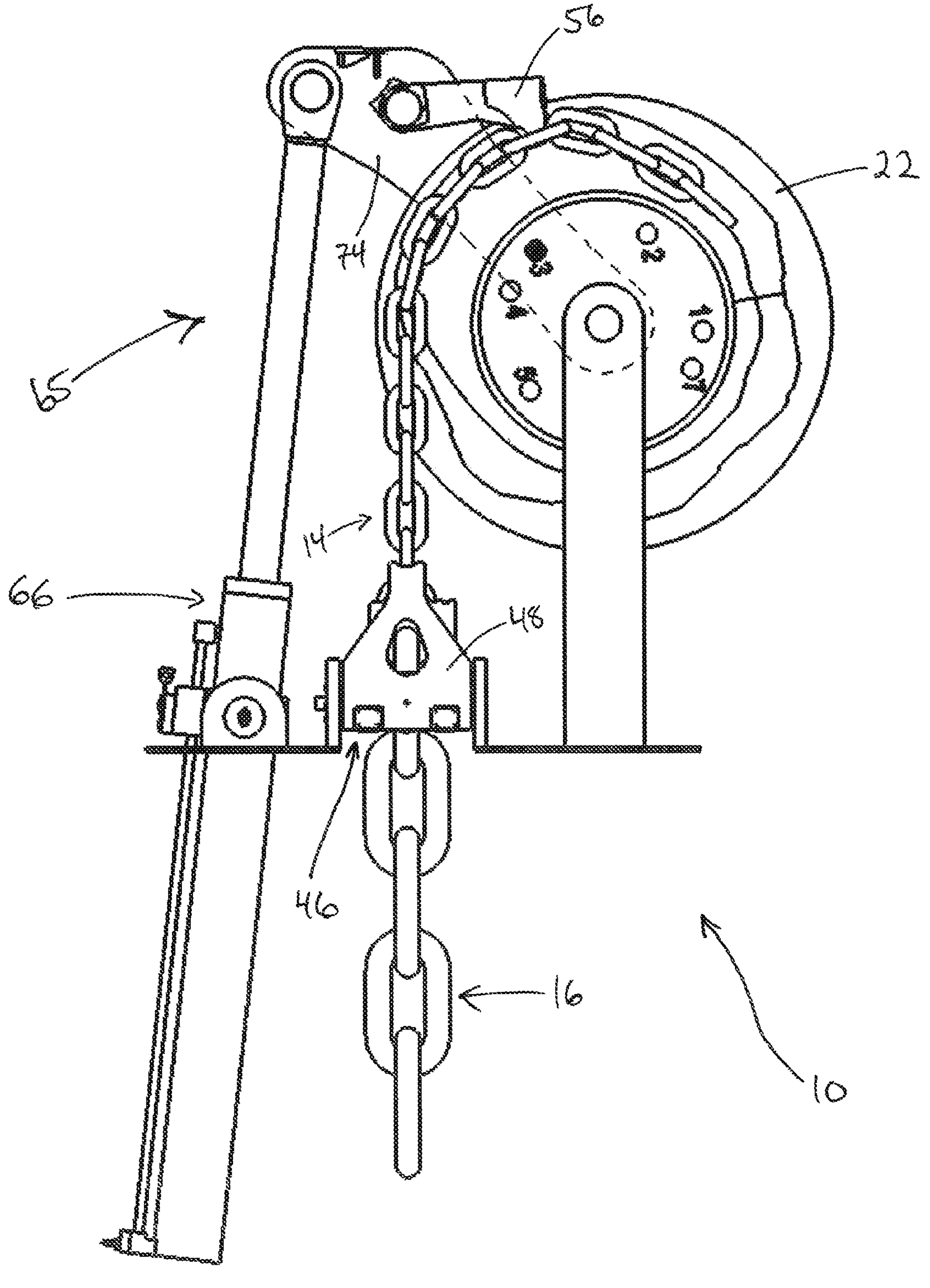

FIG. 13 shows the chain winch hauling in a portion of the chain having small chain links where the pawl element is in engagement with a chain link and the portion of the chain having large chain links approaching the chain stopper.

Figure 14:
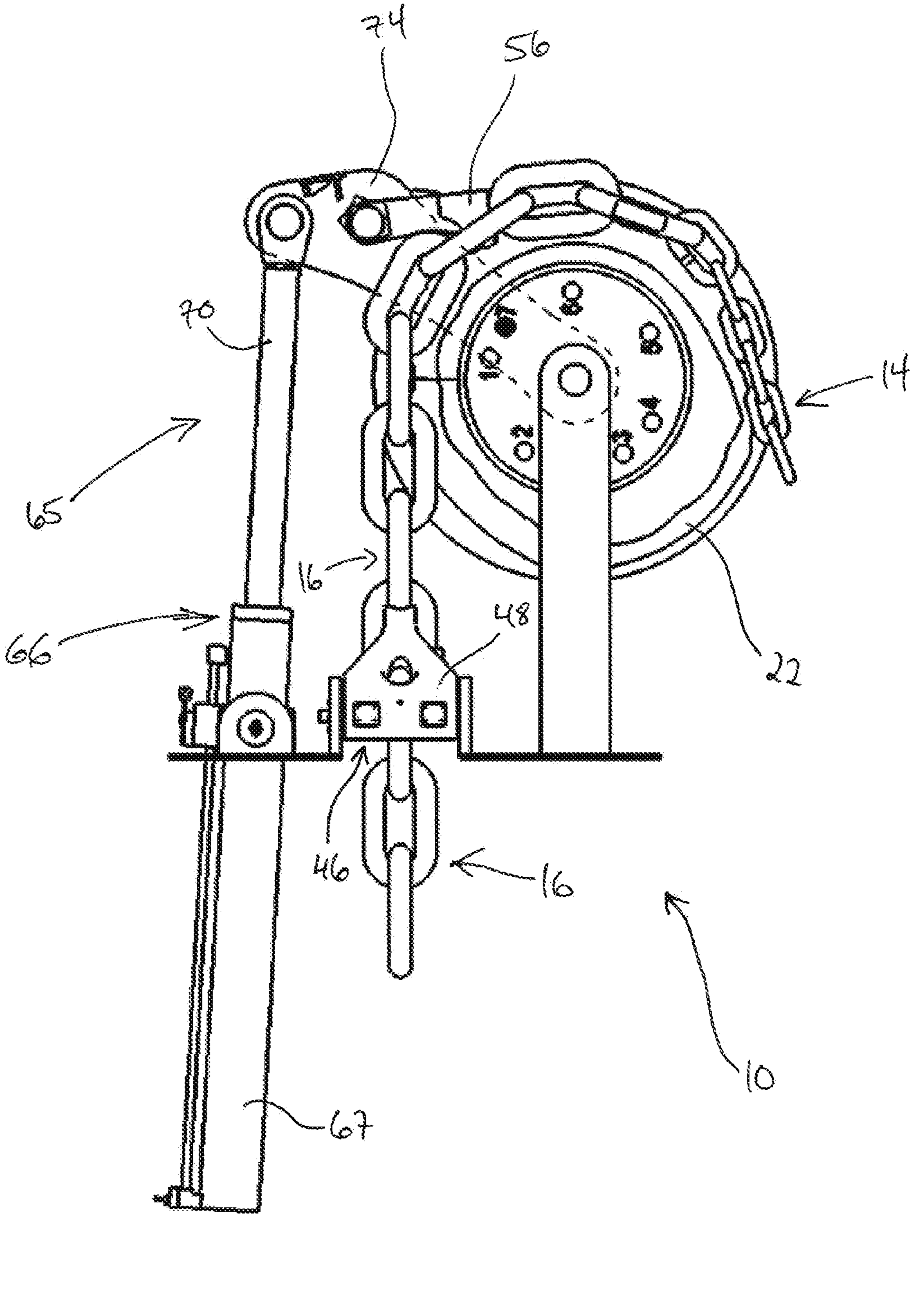

FIG. 14 shows the chain winch hauling in a portion of the chain having large chain links where the pawl element is in engagement with a chain link.

Figure 1:
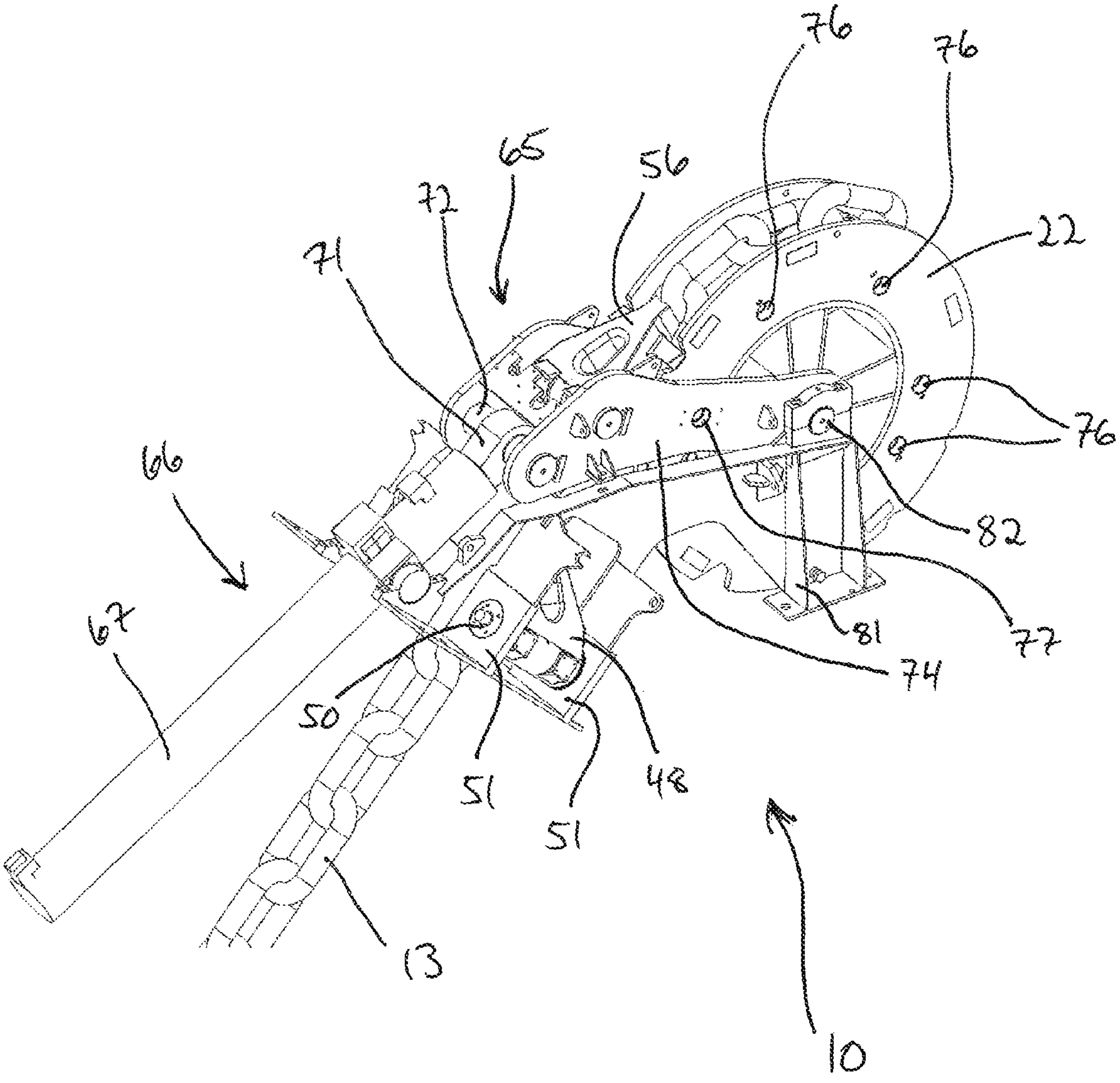
FIG. 1 shows a perspective view of a chain winch according to one or more embodiments of the present invention.

In FIG. 1 a chain winch 10 according to one or more embodiments of the present invention is shown with its main components. The chain winch comprises chain guide 22, over which a chain 13 is guided when the chain is hauled in. The chain winch 10 is designed to be capable of handling a chain 13 having chain links of at least two different sizes. Such a chain is shown in FIG. 2 where the same chain is seen in two different views where one view is turned an angle of 90 degrees as compared to the other view, i.e. a top view of the chain 13 at the top and a side view of the chain 13 at the bottom. The chain 13 comprises a first portion 14 which is provided with a plurality of first chain links 15, and a second chain portion 16 which is provided with a plurality of second chain links 17. As indicated on the drawing, the first chain links are smaller than the second chain links, and the second chain links may for example be twice as large as the first chain links. A connection link 20 is arranged between the first chain portion 14 and the second chain portion 16. An end link 19 is further used between the connection link 20 and the first chain portion 14.

The chain winch, as shown in FIG. 1, further comprises a chain guide 22 which is rotatably supported about a first rotational axis 11 (see FIG. 3), for example by mounting the chain guide 22 on a shaft 82 (see FIG. 11) which is rotatably supported by chain guide supports 81 which may be supported by a chain winch support 80. The chain guide further comprises at least one, but preferably a number of chain guide connection holes 76. The use of the chain guide connection holes 76 will be further explained below. The first rotational axis 11 defines an axial direction of the chain guide 22.

The chain winch further comprises a chain hauling device 65 for hauling the chain 13. The chain hauling device 65 comprises at least one, but preferably two arms 74 which are rotatable about the first rotational axis 11 and preferably attached to each other as indicated in the figures. The two arms 74 are arranged on either side of the chain guide 22 in the chain guide's axial direction. The arms 74 may be rotatably mounted on the shaft 82 or on any other support means that allows the arms to rotate about the same first rotational axis as the chain guide 22. The arms 74 comprise an arm connection hole 77 with a position that corresponds with each of the chain guide connection holes 76 when the arms are rotated relative to the chain guide 22. A connection bolt 78 may be passed through the arm connection holes 77 and any of the chain guide connection holes 76 which locks the arms 74 and the chain guide for relative rotational movement between the chain guide 22 and the arms 74, i.e. when the arms are rotated, the chain guide will also be rotated.

The chain hauling device 65 further comprises an actuator 66 for moving the arms 74. The actuator 66 may comprise a cylinder/piston arrangement as indicated in the figures or any other suitable actuator means that is capable of hauling in the chain 13. The cylinder/piston arrangement shown in FIGS. 1 and 11-14 comprises a cylinder 67 which is rotatably connected to a cylinder support element 68. The cylinder support element 68 may be mounted on the chain winch support 80 or on any other suitable support which is capable of taking up the forces involved during hauling in of the chain 13.

The cylinder/piston arrangement further comprises a piston 70 arranged in the cylinder 67. The piston is movable in and out of the cylinder 67, preferably by using a hydraulic system. Such hydraulic systems are well known in the art and will not be described further. The end of the piston 70 which extends outside the cylinder 67, is provided with a piston connecting element 71. The piston connecting element 71 is rotatably connected to a piston connecting bolt 72. Each end of the piston connecting bolt are connected to respective arm 74. When the arms 74 are locked to the chain guide 22 extending the piston 70 out of the cylinder 67 means that the arms are rotated about the first rotational axis 11 in a clockwise direction when seen in the view shown on FIGS. 11-14, together with the chain guide 22. If the piston 70 is retracting into the cylinder 67 the result is that the arms 74 and the chain guide 22 will be rotated anti-clockwise about the first rotational axis 11.

The chain hauling system 65 further comprises a pawl element 56 which is rotatably connected to the arms 74 such that the pawl element is capable of being moved into engagement with all types of chain links. The cylinder/piston arrangement 67, 70, the arms 74 and the pawl element 56 are designed to push on the chain as the piston 70 is extended out of the cylinder 67 and thereby hauling in one or more links of the chain 13.

The chain hauling system 65 also comprises a chain stopper 46 with at least one, but preferably two chain stopper elements 47, 48 which are rotatably connected to a chain stopper support 51, for example with a support bolt 50, such that the chain stopper elements are capable of going into and out of engagement with the chain 13. The chain stopper support 51 may be mounted on the chain winch support or on any other suitable support means. The purpose of the chain stopper 46 is to hold the chain 13 when the pawl element is moved out of engagement with the chain 13.

The chain winch according to one or more embodiments of the present invention is capable of handling a chain 13 which has chain links of different sizes. To accommodate a chain 13 with a first chain portion 14 and a second chain portion 16 having differently sized chain links, the chain guide 22 comprises at least one, but preferably two first chain supports 23 which are adapted for support of the first chain links 15 of the first chain portion 14, and at least one, but preferably two second chain supports 24 which are adapted for support of the second chain links 17 of the second chain portion 16. As can be seen on FIGS. 3 and 4, the chain guide further comprises a centre element 25 which is positioned between the two first chain supports 23. On the axial opposite side of either first support elements 23, as compared to the centre element 25, the two second chain supports 24 are arranged. On either side of the second chain supports, axially on the outside of the second support elements 24, there is provided a first side plate 26 and a second side plate 27. The width W of the centre element is at least so big that the chain links of the first chain portion 14 and the second chain portion 16 which pass over the chain guide 22 in an upright position, i.e. every second chain link, will fit between the two first chain supports 23. The arrangement of the centre element 25, the two first chain supports 23, the two second chain supports, the first side plate 26 and the second side plate 27 is clearly shown in the FIG. 5*b*.

The first chain supports 23 are provided with at least one, but preferably a plurality of first chain link pockets 41 distributed in a first support sector 32 of the first chain support 23. The two first chain supports have corresponding first chain link pockets 41 such that a lying first chain link 15 can rest on both first chain supports 23 as it passes over the chain guide 22. The second chain supports 24 are provided with at least one, but preferably a plurality of second chain link pockets 42 distributed in a second support sector 36 of the second chain support 24. The two second chain supports have corresponding second chain link pockets 42 such that a lying second chain link 17 can rest on both second chain supports 24 as it passes over the chain guide 22.

The first chain link pockets 41 are preferably designed as flat surfaces on the first chain supports 23 such that each first chain link 15 that passes over the chain guide 22 in a lying position is supported by the flat surfaces of corresponding first chain link pockets 41 on the two first chain supports 23. The second chain link pockets 42 are preferably designed as flat surfaces on the second chain supports 24 such that each second chain link 17 that passes over the chain guide 22 in a lying position is supported by the flat surfaces of corresponding second chain link pockets 42 on the two second chain supports 24.

As is illustrated on FIGS. 5*a-b* and 6*a-b*, the first support sector 32 can be divided into a first regular support sector 33, which is used to support first chain links 15 when the chain winch 10 is hauling in the first chain portion 14 of the chain 13, and a first transition support sector 34 which is used to support first chain links 15 during the first phase of the transition from hauling in the first chain portion 14 to hauling in the second chain portion 16 of the chain 13. As indicated on the figures, the first regular support sector 33 is provided with two first chain link pockets 41 and the first transition support sector 34 is provided with five first chain pockets 41, but these numbers may be different in a different design of the chain winch 10.

The second support sector 36 is divided into a second regular support sector 37, which is used to support second chain links 17 when the chain winch 10 is hauling in the second chain portion 16 of the chain 13, and a second transition support sector 38 which is used to support the connection link 20 during the second phase of the transition from hauling in the first chain portion 14 to hauling in the second chain portion 16 of the chain 13. As indicated on the figures, the second regular support sector 37 is provided with three second chain link pockets 42 and the second transition support sector 38 is provided with a connection link chain pocket 45, but these numbers may be different in a different design of the chain winch 10.

The radius of the first chain link pockets 41 in the first regular support sector 33 is smaller than the radius of the second chain link pockets 42 in the second regular support sector 37. In order to facilitate the transition from hauling in first chain links 15 of the first chain portion 14 to hauling in second chain links 17 of the second chain portion 16, i.e. the transition from hauling in small links to hauling in large links, the first chain supports 23 are designed with corresponding first chain support bulges 40 in the first transition support sector 34 which gradually increases the radius of the first chain link pockets 41 to a radius where the first chain links 15 are supported by first chain link pockets 41 which have substantially the same radius as the connection link pocket 45 in the second transition support sector 38 and the second chain link pocket 42 in the second regular support sector 37. As indicated in the figures, the last three first links 15 passing over chain support 22 will be supported on the first chain support bulge 40, the end link 19 will pass over the chain support 22 in an upright position and the connection link 20 will thereafter be supported in the connection link pocket 45 in second transition support sector 38 before the second chain links 17 are supported in the second chain link pockets 42 in the second regular support sector 37. Thereafter the second chain portion 16 of the chain 13 is hauled in such that the second chain links 17 are supported on the second chain link pockets 42 in the second regular support sector 37.

In FIGS. 6*a-b* it is clearly shown, for the purpose of illustration only since chain 13 will not be completely wrapped around the chain guide as indicated in these two figures, how the first chain links 15, the end link 19, the connection link 20 and the second chain links 20 fit into and are supported in their respective pockets as the various parts of the chain 13 pass over the chain guide 22.

Figure 3:
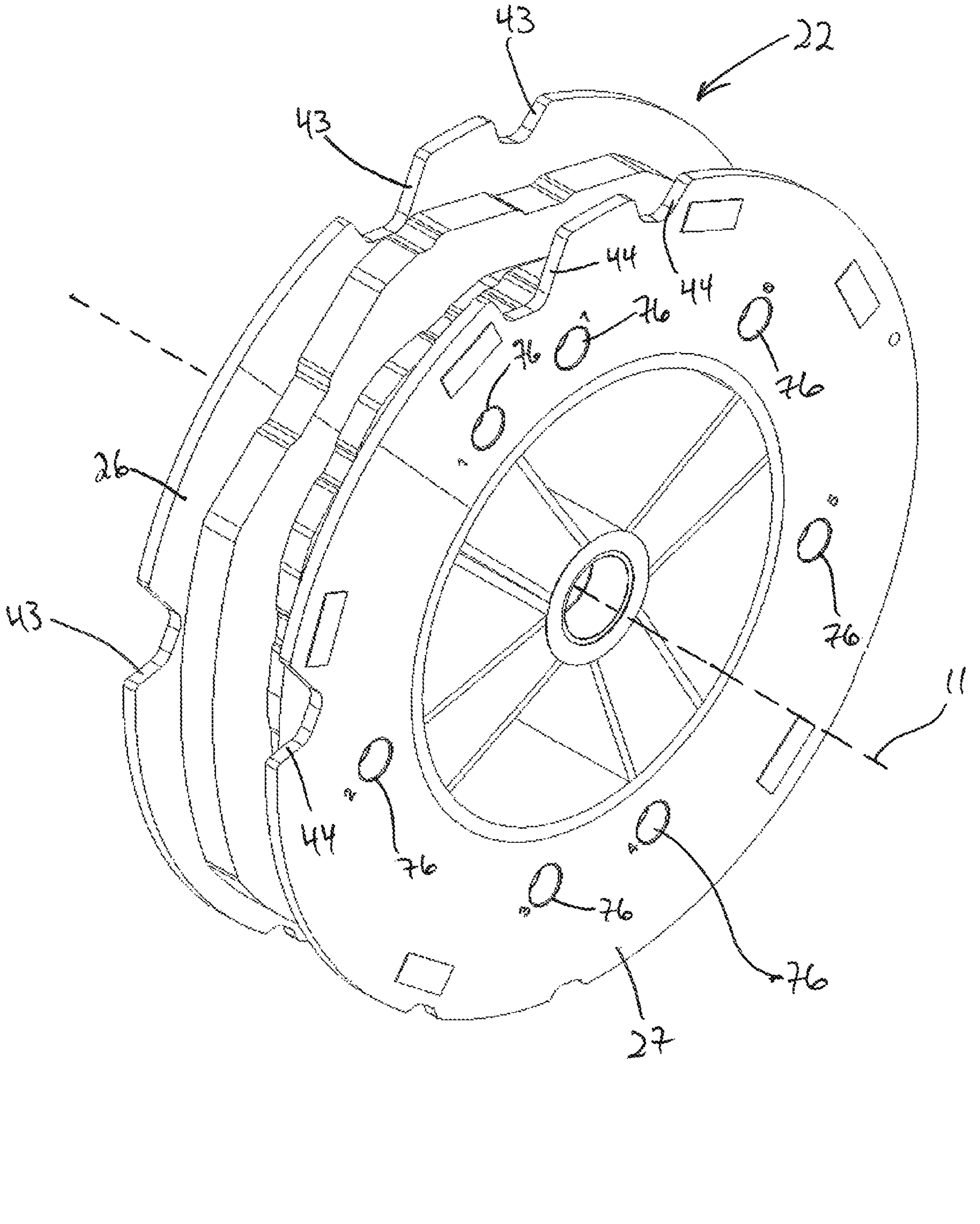
FIG. 3 shows a perspective view of a chain guide according to one or more embodiments of the present invention.
Figure 4:
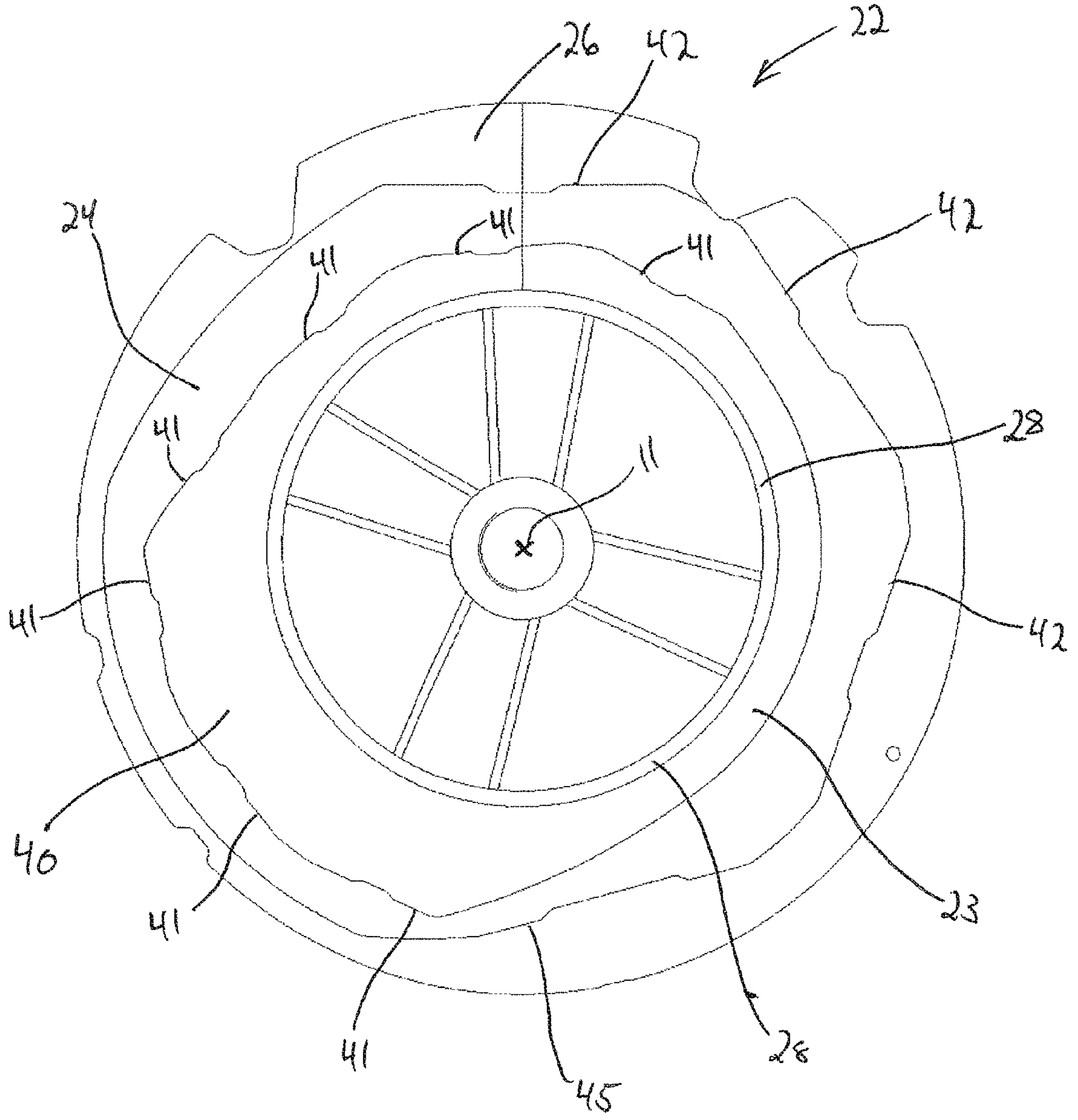
FIG. 4 shows a section through the chain guide in FIG. 3 in a plane perpendicular to the rotational axis of the chain winch.

In FIG. 3 the chain guide connection holes 76 in the second side plate 27 are clearly shown. As mention above, the arms 74 are locked to the chain guide by passing a connection bolt 78 through the arm connection holes 77 of at least one arm 74 and into one of the chain guide connection holes 76. If considered necessary, the first side plate 26 may be provided with corresponding chain guide connection holes 76 such that a bolt may be inserted both arms 74 and into one of the chain guide connection holes 76 on opposite sides of the chain guide 22. When the arms 74 are locked to one of the chain guide connection holes 76 the chain guide will be forced to rotate as the arms 74 are moved by the actuator 66. When the connection bolt 78 is removed the arms 74 can be moved while the chain guide 22 remains in its position. The arms 74 can therefore be moved to a position where the anus can be connected to any of the seven chain guide connection holes 76. As an example, a table below shows how the seven chain guide connection holes 76 of one or more embodiments of the present invention shown in figures are used.

| Hole | Sector | Purpose |
|---|---|---|
| 1 | First regular support sector | First chain portion (small chain) |
| 2 | First transition support sector | Moving small chain to large chain position |
| 3 | First transition support sector (first chain support bulge) | Small chain in large position |
| 4 | First transition support sector (first chain support bulge) | Intermediate position to make connection link fit in connection link pocket |
| 5 | Second transition support sector | Connection link passing over chain guide |
| 6 | — | Only for rotating (transporting) chain guide to last hole (hole 7) |
| 7 | Second regular support sector | Second chain portion (large chain) |

On FIGS. 7*a-b* the chain stopper 46 is shown in detail. The chain stopper preferably comprises a first chain stopper element 47 and a second chain stopper element 48 which are both rotatable between a position where the first chain stopper 47 and the second chain stopper 48 are in engagement with a chain link of the chain 13 and holds the chain 13 in its position and a position where both the first chain stopper 47 and the second chain stopper 48 are out of engagement with the chain 13 and the chain can pass through the chain stopper 46. The first and second chain stopper elements 47, 48 are provided with respective support openings 49 through which respective support bolts 50 may be passed. The first and second chain stopper elements 47, 48 may be mounted on a support bolt 50 which is rotatably supported in the chain stopper support 51. Rotating the support bolts 50 will then result in that the first and second chain stopper elements 47, 48 are rotated between the two positions described above.

Since the chain 13 comprises links of different sizes, the chain stopper is preferably provided with different chain seats which are adapted for the various sizes of the chain links of the chain 13. The first and second chain stopper elements 47, 48 are therefore provided with respective first chain seats 52 which are adapted for support of the first chain links 15 of the first chain portion 14 and respective separate second chain seats 53 which are adapted for support of the second chain links 17 of the second chain portion 16. The second chain seats 53 may also accommodate the end link 19 and the connection link 20. In FIG. 8*a* it is clearly shown how the first chain seats 52 supports a first chain link 15 in the first chain portion 14 while FIG. 8*b* clearly shows how the second chain seats 53 supports a second chain link 17 in the second chain portion 16. Alternatively an actuator may be connected directly to each chain stopper element 47, 48 in order to move the chain stopper elements between the two positions described above.

In FIG. 9 the pawl element 56 is shown in detail. The pawl element may be provided with a support opening 57 through which a support bolt 58 may be passed. The pawl element 56 may be mounted on the support bolt 58 which is rotatably supported in the arms 74. Rotating the support bolt 58 will then result in that the pawl element 56 is rotated between two positions, a position where the pawl element 56 is in engagement with a chain link of the chain 13 and is capable of holding and pushing on the chain 13 until one or more chain links have been hauled in and a position where the pawl element is out of engagement with the chain 13 and the pawl element 56 can be returned by the arms 74, which are connected to the cylinder/piston arrangement, to be ready for another stroke. Alternatively an actuator may be connected directly to the pawl element 56 in order to move the pawl element between the two positions described above.

The pawl element 56 is also provided with a first pawl element chain seat 59 which is adapted for support of the first chain links 15 of the first chain portion 14 and a separate second pawl element chain seat 60 which is adapted for support of the second chain links 17 of the second chain portion 16. The first pawl element chain seat 59 also accommodates the connection link 20.

The pawl element 56 may further be provided with a first side element 61 and a second side element 62. The first side element 61 and the second side element 62 are designed to fit into corresponding first side plate recesses 43 on the first side plate 26 and second side plate recesses 44 on the second side plate 27 respectively. The position of the various pairs of recesses 43, 44 on the first and second side plates 26, 27 are position so that the first side element 61 and the second side element 62 of the pawl element fall into the first side plate recess 43 and the second side plate recess 44 respectively when the pawl element 56 is in engagement with one of the chain links of the chain 13. The depth of the first and second side plate recesses 43, 44 are decided by the size of the chain link that the pawl element engages and the position of the chain guide 22. When the pawl element 56 engages a first chain link 15 in the first regular support section 33 it will need to go down deeper into the chain guide 22 and the first and second side plate recesses 43, 44 need to be deeper than in the position of the chain guide 22 where first chain links 15 are supported on the first chain support bulge 40 in the first transition support section 34. In FIG. 10*a* it is clearly shown how the pawl element 56 engages a first chain link 15. In FIG. 10*b* the pawl element 56 is shown in engagement with the connection link 20 and in FIG. 10*c* the pawl element is shown in engagement with a second chain link 17.

In FIGS. 11-14 the chain winch is shown in a few positions during the hauling in of a chain 13 comprising first chain links 15 and second chain links 17 where the second chain links are smaller than the second chain links as illustrated in FIG. 2.

In FIG. 11 the first chain portion 14 of the chain 13 is passing through the chain stopper 46 and thereafter over the chain guide 22 of the chain winch 10. The chain 13 may be collected in a suitable container (not shown on the figures) below the chain guide after the chain 13 has passed over the chain guide. The pawl element 56 is in engagement with a first chain link 15 and is shown towards the end of a stroke of the actuator 66. At the end of the stroke of the actuator 66, the first and second chain stopper elements 47, 48 engage the first chain link 15 which is in the chain stopper and the pawl element 56 is moved out of engagement with the chain 13. The arms 74 are moved back by the actuator and if the arms are connected to the chain guide 22 with the bolt 78, the chain guide 22 will be forced to follow the rotation of the arms 74. The chain 13 will not follow the rotation of the chain guide 22 because the chain stopper 46 is in engagement with the chain 13 and the chain 13 will therefore slide over the chain guide 13.

In FIG. 12 the actuator 66 is shown in a retracted position and the pawl element 56 is out of engagement with the chain 13. The chain guide has been transported to another hole which can be done by removing the connection bolt 78 so that the arms 74 and the chain guide 22 is unconnected and the arms can be moved to a position where the arm connection hole 77 lines up with the desired chain guide connection hole 76 and then put the connection bolt 78 back so that the arms 74 is connected to the chain guide 22 again at the new desired position.

In FIG. 13 the actuator is in an extended position and the pawl element 56 is engagement with a first chain link 15 of the chain. In this figure it is also shown that the first chain links 15 are supported on the first chain support bulge 40 of the first chain support 23 and the connection link is now positioned in the chain stopper 46.

In FIG. 14 the actuator 66 is again in an extended position and the pawl element is now in engagement with a second chain link 17 of the second chain portion 16 of the chain 13. The first chain portion 14 has completely been hauled in and has almost completely passed over the chain guide 22. It may also be noted that the arms 74 is now connected to the last of the chain guide connection holes 76 and as the chain winch 10 hauls in more chain 13, the chain guide 22 will be moved back and forth so that second chain links 17 of the chain are supported in the second chain link pockets 42 of the second regular support sector 37 during each stroke of the actuator 66.

In use, when the chain winch 10 is hauling in the chain 13, the chain guide 22 will be rotated back and forth by the arms 74 which in turn are rotated by the actuator 66. Which support sector 33, 34, 37, 38 on the chain guide 22 is used for supporting the links of the chain 13 at any particular time depends on in which position the arms 74 are attached to the chain guide 22, i.e. to which chain guide connection hole 76 the arms 74 are attached. To change the support sector 33, 34, 37, 38 that is used for hauling in the chain 13, the arms 74 are released from the chain guide 22 and then moved to the desired position such that the arm connection holes 77 are in line with the desired chain guide connection hole 76 and a bolt is inserted into chain guide and arm holes 76, 77 that are aligned.

Finally, it should be noted that the first transition support sector 34 does not necessarily start where the first regular support sector 33 ends since the chain guide 22 can easily be transported between the first transition support sector 34 and the first regular support sector 33 if they are not positioned next to each other. On the other hand, the first transition support sector 34 and the second transition support section 38 are preferably positioned next to each other since the second transition support section 38 will follow the first transition support sector 34 and if the chain guide 22 is transported at this stage, the first chain support bulge 40 would be rotated out of its position and the first chain links 15 supported on the first chain support bulge 40 would move to a position with a smaller radius and the transition from supporting the first chain links 15 on the first chain support 23 to supporting the second chain links 17 on the second chain support 24 could fail.

The invention claimed is:

1. A chain guide for a chain winch, the chain guide being rotatable about a first rotational axis and adapted for support of a chain comprising chain links having at least two different sizes where a first chain portion comprises a plurality of first chain links and a second chain portion comprises a plurality of second chain links, the size of the second chain links being larger than the size of the first chain links, wherein the chain guide comprises at least one first chain support, which is adapted for support of at least the first chain links of the first chain portion, and at least one second chain support, which is adapted for support of at least the second chain links of the second chain portion, wherein the at least one first chain support comprises a first support sector comprising a first regular support sector and a first transition support sector for support of at least the first chain links of the first chain portion, wherein the at least one first chain support comprises a first chain support bulge having a plurality of chain pockets arranged on a portion of a circumference of the first chain support to support and gradually bring the first chain portion of the chain to a radial distance from the first rotational axis which facilitates the transition from support of the first chain portion on the at least one first chain support to support of the second chain portion on the at least one second chain support, and wherein the at least one second chain support comprises a second support sector comprising a second regular support sector and a second transition support sector for support of the second chain links of the second chain portion and at least one connection link respectively.

2. The chain guide according to claim 1, wherein the first support sector of the at least one first chain support comprises at least one first chain link pocket which is adapted for support of a first chain link.

3. The chain guide according to claim 2, wherein the second support sector of the at least one second chain support comprises at least one second chain link pocket which is adapted for support of a second chain link.

4. The chain guide according to claim 1, wherein the first transition support sector is designed to bring the first chain portion of the chain to a radial distance from the first rotational axis which facilitates the transition from support of the first chain portion on the at least one first chain support to support of the second chain portion on the at least one second chain support.

5. The chain guide according to claim 1, wherein the first transition support sector is provided with at least one first chain link pocket for support of a first chain link.

6. The chain guide according to claim 1, wherein in the second transition support sector there is provided at least one connection link pocket for support of at least one connection link which links the first chain portion and the second chain portion of the chain.

7. The chain guide according to claim 1, wherein the chain guide comprises a centre element disposed between a first and a second first chain support in the axial direction, and the first and the second first chain supports and the centre element are arranged between a first and a second second chain supports in the axial direction.

8. The chain guide according to claim 7, wherein the chain guide further comprises two side plates between which the first and second first chain supports, the first and second second chain supports and the centre element are arranged.

9. The chain guide according to claim 1, wherein the chain guide is adapted for a rotational back and forth movement during hauling in of the chain.

10. The chain guide according to claim 9, wherein the chain guide comprises an attachment for releasable connection of the chain guide to a rotatable arm of the chain winch.

11. A chain winch for a chain comprising chain links having at least two different sizes where a first chain portion comprises a plurality of first chain links and a second chain portion comprises a plurality of second chain links, the size of the second chain links being larger than the size of the first chain links, wherein the chain winch comprises a chain guide according to claim 1.

12. The chain winch according to claim 11, wherein the chain winch is provided with a chain hauling device comprising a pawl element which is capable of engaging a chain link of the chain, the chain hauling device moving the pawl element.

13. The chain winch according to claim 12, wherein the pawl element is provided with a first chain seat which is adapted for support of a first chain link of the first chain portion, and a second chain seat which is adapted for support of a second chain link of the second chain portion.

14. The chain winch according to claim 11, wherein the chain winch comprises a chain stopper which is provided with at least one chain stopper element, the at least one chain stopper element being capable of supporting and holding the chain.

15. The chain winch according to claim 14, wherein at least one chain stopper element comprises a first chain seat which is adapted for support of a first chain link of the first chain portion, and a second chain seat which is adapted for support of a second chain link of the second chain portion.

16. The chain winch according to claim 12, wherein the chain hauling device comprises at least one arm for rotation of the chain guide, the at least one arm being adapted for releasable attachment to the chain guide.

17. The chain winch according to claim 16, wherein the at least one arm and the chain guide are configured for releasable attachment of the at least one arm to the chain guide at a plurality of relative positions between the at least one arm and the chain guide.

18. The chain winch according to claim 16, wherein the chain guide comprises an attachment for releasable connection of the chain guide to the at least one rotatable arm.

19. The chain winch according to claim 12, wherein the chain hauling device further comprises at least one actuator which effects a rotational back and forth movement of the at least one arm and the pawl element.

* * * * *